United States Patent Office 3,410,835
Patented Nov. 12, 1968

3,410,835
PROCESS FOR PREPARING ACRYLIC POLYMERS
Corrado Mazzolini and Sergio LoMonaco, Mestre, Venezia, Italy, assignors to Monsanto Company, St. Louis, Mo., a corporation of Delaware
No Drawing. Continuation-in-part of application Ser. No. 440,625, Mar. 17, 1965. This application June 30, 1965, Ser. No. 468,620
19 Claims. (Cl. 260—78.5)

ABSTRACT OF THE DISCLOSURE

Improvement in whiteness of fiber-forming acrylonitrile based polymers has been found through the use of a Redox initiator system comprising a water-soluble salt of persulfuric acid activated by a water-soluble alkaline earth salt of a reducing sulfoxide compound.

---

This application is a continuation-in-part of copending application Serial No. 440,625, filed on March 17, 1965 and now abandoned.

The present invention relates to a process for preparing acrylonitrile polymers. More particularly, the present invention relates to a polymerization process for obtaining with high yields acrylonitrile polymers and copolymers having a high degree of whiteness, excellent stability to heat and a good dyeability with basic dyes.

It is known to carry out the polymerization of the acrylonitrile alone or in admixture with other ethylenically unsaturated monomers, which are copolymerizable with it, in an aqueous medium having a pH below 7, by using as catalysts Redox systems such as for instance persulfates of alkaline or ammonium salts activated by a reducing sulfoxide agent, such as for instance sulfur dioxide, pyrosulfites, hydrogenated alkaline or ammonium sulfites. The alkaline salts usually employed are sodium or potassium salts.

Although this process is quite satisfactory as far as the yield is concerned, the polymers obtained are not as white as desired and they are not stable to thermal color-degradation resisting.

For the preparation of filaments, the acrylonitrile polymer is dissolved in an organic solvent such, as for instance, N,N-dimethyl-acetamide or N,N-dimethylformamide and this operation requires the heating of the polymer in the solvent until complete dissolution has taken place. Moreover, the solution is kept at a high temperature during the filtering and subsequent spinning operations, so that any instability to heat on the part of the polymer gives rise to a fiber whose color is somewhat off white.

Various efforts have been made to produce whiter and more color stable polymers, such as, for instance, carrying out the polymerization of the acrylonitrile alone or in admixture with other ethylenically unsaturated copolymerizable monomers at a low temperature, by increasing the weight ratio of the sulfoxy activator with respect to the peroxy catalyst. These methods, though yielding white and thermally stable polymers have the disadvantage of producing low conversions.

It has now been found and forms the object of the present invention, that acrylonitrile polymers or copolymers thereof containing at least 80% by weight of acrylonitrile which have an exceptional degree of whiteness and an excellent stability to heat, suitable for obtaining of fibers and filaments of high whiteness, good resistance to heat and good dyeability by basic dyestuffs, can be obtained in high yields by a process which comprises polymerizing a monomer mixture containing acrylonitrile alone or in admixture with one or more unsaturated ethylenic copolymerizable compounds in the presence of a Redox catalyst system formed by a water soluble salt of the persulfuric acid activated by a water soluble alkaline earth salt of a reducing sulfoxide agent.

Unexpectedly, it has been found that by operating with alkaline or ammonium ions held to a minimum both during the polymerization and in subsequent treatments, such as in shortstopping, washing, etc. of the polymer, the polymers or copolymers thus obtained have a high degree of whiteness and excellent stability to heat, and which are particularly suitable for producing fibers and filaments of high whiteness and excellent stability to heat which, in turn, can be satisfactorily used for preparing any textile manufactured goods.

The term water-soluble salt of the persulfuric acid includes sodium persulfate, potassium persulfate, ammonium persulfate, barium persulfate, magnesium persulfate, calcium persulfate and the like. Among these, the preferred salt is the magnesium persulfate.

As water-soluble alkaline earth salts of a reducing sulfoxide agent is intended any alkaline earth salt derived from an acid of sulfur in which the valence of the sulfur is not higher than 4 and from a hydroxide in which the metal is barium, calcium, magnesium or strontium. Among these, the preferred salts are magnesium salts for their higher solubility.

The amount of catalyst present usually comprises between about 0.05% and about 1% by weight based on the monomers present in the reaction. Whereas the activator must be present in such an amount that the activator to catalyst ratio is at least about two and preferably between about 2 and about 6.

According to one of the preferred embodiment of the invention, the polymerization of the acrylonitrile with or without an ethylenic monomer having side groups of high steric dimensions and with or without a comonomer having an acid function available for fixing the basic dyes is carried out in an aqueous medium having a water to monomers ratio ranging from about 3:1 to about 7:1, at a temperature between about 40° C. and about 60° C. and at a pH maintained below about 7 and preferably between about 2.5 and about 3.5 by using magnesium persulfate as catalyst activated by magnesium bisulfite.

In general, the ethylenic monomers, having side groups of high steric overall dimensions, which are copolymerizable with acrylonitrile, preferably in amounts of up to 20% by weight, are methylmethacrylate, ethylmethacrylate butylmethacrylate, octylmethacrylate, methoxyethylmethacrylate, phenylmethacrylate, cyclohexylmethacrylate, dimethylamidoethylmethacrylate and the corresponding acrylates, acrylamides and methacrylamides or their alkyl substituted products, unsaturated ketones, such as methylvinyl ketone, phenylvinyl ketone, methylisopropenyl ketone, and the like, vinyl carboxylates such as vinyl formate, vinyl acetate, vinyl propionate, vinyl butyrate, vinyl thioacetate, vinyl benzoate, esters of the unsaturated carboxylic acids such as maleic, fumaric, citraconic, and the like. N-alkyl maleimides, N-vinylcarbazoles, N-vinyl succinimide, N-vinyl phthalimide, vinyl ethers, styrene and its alkyl derivatives, and vinyl and vinylidene halides such as vinyl chloride, vinyl bromide, vinylidene chloride and the like.

Polymers having excellent dyeability by basic dyestuffs, can be obtained by adding to the reaction mixture a third comonomer having an acid function available for the fixing of the basic dyes and likewise copolymerizable with acrylonitrile. Such comonomer having an available acid function, may be selected from a group consisting of itaconic acid, cinnamic acid, maleic acid or anhydride, carboxyvinylphthalic acid, vinylbenzenesulfonic acid, allylsulfonic acid, allyloxyethylsulfonic acid, methallyloxyethylsulfonic acid, allylthioethylsulfonic acid, isopropenylbenzenesulfonic acid, vinylbromobenzenesulfonic acid, vinylfluorobenzenesulfonic acid, vinylethylbenzenesulfonic acid and the like and the corresponding salts vinylic-dichlorobenzenesulfonic acid, vinylic-trihydroxybenzenesulfonic acid, acetylethylenesulfonic acid, naphthylethylenesulfonic acid, propenesulfonic acid and the like and salts thereof and furthermore p-methylacrylamidebenzenesulfonic acid, p-methylallyloxybenzenesulfonic acid, methallylsulfonic acid, methacrylamidebenzenesulfonic acid and the like and the corresponding salts.

In order to more clearly show the advantages and results of this invention, the following examples and tables are given Table I recording the degree of whiteness and stability to heat, while Table II records the properties of the fibers obtained from the above polymers. From Table I it can clearly be seen how with the same activator to catalyst ratio, the same pH of solution and the same specific viscosity, the original color and the stability to heat both of the polymers and the fibers are improved as the alkaline or ammonium ions, present in the solution are decreased.

In order to evaluate the color, reference is made to the C.I.E. color representation and measuring system. By this system the color is expressed in terms of dominant wave length (DWL), purity (P) and brightness (B) referred to the standard illuminant (C) which is an emission source corresponding to a black body at 6200° K.

$$W = \frac{B - 1.8\ P^2 - 9.6}{0.00825}$$

wherein
B = brightness
P = purity multiplied by a correction factor F=f(DWL), that is, correction factor (F) is a function of the dominant wave length.
W = whiteness (Cfr. Journal of the Optical Society of America, vol. 28, p. 52 (1938) and publications of the National Bureau of Standards in the Paper Trade Journal, vol. 103 108, p. 38 (1936).

The thermal sensitivity (resistance to heat) is indicated by the variation of the purity index ($\Delta PI$) and by the variation of brightness ($\Delta B$) of the sample after heating by a forced ventilation oven at 145° C. for 8 hours for the polymer and for 25 minutes for the fiber. As used in Tables I and II Purity Index (PI) is a value determined by subtracting Purity from 100.

EXAMPLE 1

Into a 3 liter polymerization reactor are continuously fed two aqueous streams containing respectively 0.6 part of potassium persulfate catalyst and 1.38 parts of potassium bisulfite activator, this latter being partially neutralized by sodium bicarbonate, the activator to catalyst ratio being 2.3, and a third stream of monomers consisting of a mixture of 91 parts by weight of acrylonitrile and 9 parts by weight of vinyl acetate.

The quantity of water charged amounts to 2.5 liters/hour and the quantity of monomers amounts to 0.5 liter/hour. The reaction temperature is maintained at 50° C. Through an overflow pipe or duct the aqueous suspension of the resulting polymer is then discharged, filtered, repeatedly washed with water, then with acetone and again with water in order to eliminate all foreign matter and unreacted monomers, and is then finally dried in an oven at 80° C. for 12 hours.

Under standard polymerization conditions about 350 to 400 grams per hour of copolymers are obtained in which the acrylonitrile and vinyl acetate are copolymerized in a weight ratio of 93 to 7. The results of the determination of properties of the polymer are recorded in Table I.

EXAMPLE 2

The same polymerization process as described in Example 1 is repeated by using as the catalyst 0.55 part by weight of potassium persulfate and 1.26 parts by weight of magnesium bisulfite, the activator to catalyst ratio being 2.3. The results of the measurements of properties carried out on the polymer obtained are reported in Table I.

EXAMPLE 3

The same polymerization process as described in Example 1 is repeated by using as the catalyst 0.5 part by weight of magnesium persulfate and 1.15 parts by weight of magnesium bisulfite, the activator to catalyst ratio being 2.3. The results of the measurements carried out on the polymer obtained are reported in Table I.

EXAMPLE 4

Into a 3 liter polymerization reactor are continuously fed two aqueous streams containing respectively 0.5 part by weight potassium persulfate catalyst and 1.5 parts by weight of sulfur dioxide activator, this latter being partially neutralized by sodium bicarbonate, the activator to catalyst ratio being 3:1, and a third stream of monomers consisting of a mixture of 90.5 parts by weight of acrylonitrile, 9 parts by weight of vinyl acetate and 0.5 parts by weight of cinnamic acid. The feed rate of water is 2.3 lt./hr. and that of the monomers is 0.5 lt./hr.

The reaction temperature is maintained at about 50° C. The aqueous suspension of the polymer thus obtained is discharged through an overflow pipe. It is then filtered, repeatedly washed with water, acetone and then again with water in order to eliminate all foreign matter and unreacted monomers, and it is then finally dried in a suitable oven at 80° C. for 12 hours.

Under standard conditions of polymerization about 350 gr./hr. of copolymer are obtained in which the acrylonitrile, vinyl acetate and cinnamic acid are found to be polymerized in ratios of 92.5 to 7 to 0.5 respectively. The results of the measurements carried out on the copolymer obtained are recorded in Table I.

EXAMPLE 5

The same polymerization process as described in Example 4 is repeated by using as the catalyst 0.5 part by weight of potassium persulfate and as the activator 1.15 parts by weight of magnesium bisulfite, the activator to catalyst ratio being 2.3. The results of the measurements carried out on the copolymer obtained are recorded in Table I.

EXAMPLE 6

The same polymerization process as described in Example 4 is repeated by using as the catalyst 0.8 part by weight of magnesium persulfate and as the activator 1.84 parts by weight of magnesium bisulfite with an activator to catalyst ratio of 2.3. The results of the measurements carried out on the copolymer thus obtained are recorded in Table I.

EXAMPLE 7

Into a 3 liter polymerization reactor are continuously fed two aqueous streams containing respectively 0.6 part by weight of a potassium persulfate catalyst and 1.38 parts by weight of sulfur dioxide activator, this latter being partially neutralized by sodium bicarbonate, the activator to catalyst ratio being 2.3 and a third stream of monomers consisting of a mixture of 90.5 parts by weight of acrylonitrile, 9 parts by weight of vinyl acetate, and 0.5 part by weight of sodium p-methallyloxybenzene sulfonate.

The feed rate of the water is 2.3 lt./hr. and that of the monomers is 0.5 lt./hr. The reaction temperature is maintained at about 50° C. The aqueous suspension of the polymer thus obtained is discharged through an overflow pipe. It is then filtered, repeatedly washed with water, with acetone and then again with water in order to eliminate all foreign substances and unreacted monomers, and finally dried in an oven at 80° C. for 12 hours.

Under standard conditions of polymerization about 350 gr./hr. of copolymer are obtained in which the acrylonitrile, vinyl acetate and sodium p-methallyloxybenzene sulfonate are found to be copolymerized in ratios of 92.5 to 7 to 0.5 respectively. The results of the measurements carried out on the copolymer obtained are recorded in Table I.

EXAMPLE 8

The polymerization described in Example 7 is repeated using as the catalyst 0.55 part by weight of potassium persulfate and as the activator 1.26 parts by weight of magnesium bisulfite with an activator to catalyst ratio of 2.3. The results of the measurements carried out on the copolymer thus obtained are recorded in Table I.

EXAMPLE 9

The polymerization described in Example 7 is repeated by using as the catalyst 0.23 part in weight of magnesium persulfate and as the activator 1.15 parts in weight of magnesium bisulfite with an activator to catalyst ratio of 5. The results of the measurements carried out on the copolymer thus obtained are recorded in Table I.

EXAMPLES 10–11

The polymers obtained in Examples 1 to 9 are used to produce fibers by spinning, in the usual way, solutions of the polymers in dimethylformamide by a wet spinning process. The properties of the fibers thus obtained are recorded in Table II.

TABLE I

| Ex. | Conversion, percent | Intrinsic Viscosity (N) in dl./gr. | Original Color | | Heat Sensitivity | |
|---|---|---|---|---|---|---|
| | | | PI | B | ΔPI | ΔB |
| 1 | 68.5 | 1.49 | 98.5 | 94.7 | 11.5 | 15.2 |
| 2 | 72.4 | 1.23 | 98.6 | 96 | 9.1 | 8.6 |
| 3 | 76.2 | 1.42 | 98.8 | 95.1 | 8.5 | 7.5 |
| 4 | 71 | 1.54 | 98.2 | 94.4 | 19.1 | 26 |
| 5 | 72.3 | 1.72 | 98.9 | 94.7 | 12.4 | 11.8 |
| 6 | 74.6 | 1.33 | 99.3 | 94.6 | 11.4 | 10.4 |
| 7 | 67.8 | 1.54 | 98.8 | 94.3 | 12.2 | 16.6 |
| 8 | 72.2 | 1.44 | 99.9 | 95.3 | 9.8 | 8.6 |
| 9 | 69 | 1.66 | 99.5 | 94.5 | 7.9 | 9.6 |

TABLE II

| Ex. | Polymer Used | Original Color | | | Heat Sensitivity | | Tenacity, gr./den. | Elongation at Break, percent |
|---|---|---|---|---|---|---|---|---|
| | | DWL | PI | B | ΔPI | ΔB | | |
| 10 | Poly. of Ex. 1 | 575 | 92.6 | 76 | 3.4 | 3.7 | 2.8 | 30 |
| 11 | Poly. of Ex. 2 | 574 | 94 | 79 | 1.6 | 2.1 | 2.7 | 32 |
| 12 | Poly. of Ex. 3 | 574.5 | 95 | 79.5 | 1.4 | 1.3 | 2.8 | 33 |
| 13 | Poly. of Ex. 4 | 578 | 91.3 | 74.2 | 5.8 | 4.1 | 2.95 | 33.4 |
| 14 | Poly. of Ex. 5 | 575 | 92.4 | 76.9 | 2.9 | 3.9 | 2.8 | 38 |
| 15 | Poly. of Ex. 6 | 574 | 94 | 78.5 | 2.6 | 1.5 | 2.7 | 36 |
| 16 | Poly. of Ex. 7 | 573.7 | 92.5 | 73.8 | 4.1 | 2.8 | 2.7 | 33 |
| 17 | Poly. of Ex. 8 | 570 | 94.3 | 76.3 | 2.4 | 2.3 | 2.8 | 37 |
| 18 | Poly. of Ex. 9 | 571 | 94.4 | 78.7 | 1.8 | 1.7 | 2.6 | 34 |

We claim:

1. A process for producing acrylonitrile polymers comprising at least 80% by weight of acrylonitrile and up to 20% of at least one other copolymerizable mono-olefinic monomer having an exceptional degree of whiteness and an excellent stability to heat, which comprises polymerizing a polymerization mixture comprising monomers selected from the group consisting of acrylonitrile, and a mixture of acrylonitrile and up to 20% of at least one other copolymerizable mono-olefinic monomer in the presence of a catalytic Redox system comprising a water-soluble salt selected from the group consisting of sodium, potassium, ammonium, barium, magnesium and calcium salts of persulfuric acid activated by a water-soluble alkaline earth salt of a reducing sulfoxide agent wherein the ratio of said salt of a reducing sulfoxide to said salt of persulfonic acid is greater than about 2.

2. A process according to claim 1 wherein the activator to catalyst ratio is between about 2 and about 6.

3. A process according to claim 1 wherein the water-soluble alkaline earth salt of a reducing sulfoxide agent is magnesium bisulfite.

4. A process according to claim 1 wherein the water-soluble salt of persulfuric acid is magnesium persulfate.

5. A process according to claim 1 wherein the water-soluble salt of persulfuric acid is magnesium persulfate and the water-soluble alkaline earth salt of a reducing sulfoxide agent is magnesium bisulfite.

6. A process according to claim 1 wherein there is used an amount of catalyst of between about 0.05% and about 1% by weight, based upon the monomer present in the reaction.

7. A process according to claim 1 wherein the acrylonitrile is polymerized with at least one copolymerizable ethylenically unsaturated comonomer having a side group of considerable overall steric dimensions.

8. A process according to claim 1 wherein the acrylonitrile is polymerized with at least one vinylic comonomer having at least one free acid function.

9. A process according to claim 1 wherein the acrylonitrile is polymerized with at least one copolymerizable ethylenically unsaturated comonomer having a side group of considerable overall steric dimensions and with at least one vinylic comonomer having at least one free acid function.

10. A process according to claim 8 wherein the ethylenically unsaturated comonomer having a side group of considerable overall steric dimensions is selected from the group consisting of alkyl-, aryl-, or cycloalkylacrylates; alkyl-, aryl-, or cycloalkylmethacrylates; acrylamides and corresponding alkyl derivatives, unsaturated ketones, vinylcarboxylates, vinylethers, vinyl halides, styrene and its alkyl derivatives.

11. A process according to claim 8 wherein the vinylic comonomer having at least one free acid function is selected from the group consisting of itaconic acid, cinnamic acid, maleic acid, maleic anhydride, carboxyvinylphthalic acid, sulfonic acids containing an ethylenically unsaturated bond and the alkali, alkaline earth and ammonium salts thereof.

12. A process according to claim 8 wherein the acrylonitrile is polymerized with up to 20% of vinyl acetate.

13. A process according to claim 10 wherein the acrylonitrile is polymerized with up to 20% of vinyl acetate and cinnamic acid.

14. A process according to claim 10 wherein the acrylonitrile is polymerized with up to 20% of vinyl acetate and sodium p-methallyloxybenzene sulfonate.

15. Polymers of acrylonitrile comprising at least 80% of acrylonitrile and up to 20% of at least one other copolymerizable mono-olefinic monomer and having a high degree of whiteness and resistance to heat obtained by the process of claim 1.

16. Polymers of acrylonitrile comprising at least 80% of acrylonitrile and up to 20% of vinyl acetate and sodium p-methallyloxybenzene sulfonate and having a high degree of whiteness and resistance to heat and good dyeability with basic dyes obtained by the process of claim 1.

17. Polymers of acrylonitrile comprising 90.5% of acrylonitrile, 9% of vinyl acetate and 0.5% of sodium p-methallyloxybenzene sulfonate and having a high degree of whiteness and resistance to heat and good dyeability with basic dyes obtained by the process of claim 1.

18. Fibers having a high degree of whiteness and resistance to heat produced from the polymers of claim 16.

19. Fibers having a high degree of whiteness, resistance to heat and good dyeability with basic dyes produced from the polymers of claim 18.

No references cited.

JOSEPH L. SCHOFER, *Primary Examiner.*

JOHN KIGHT, *Assistant Examiner.*